(12) United States Patent
Naware et al.

(10) Patent No.: US 10,445,856 B2
(45) Date of Patent: *Oct. 15, 2019

(54) GENERATING AND DISPLAYING AN ACTUAL SIZED INTERACTIVE OBJECT

(71) Applicant: eBay Inc., San Jose, CA (US)

(72) Inventors: Mihir Naware, Redwood City, CA (US); Jatin Chhugani, Santa Clara, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,262

(22) Filed: Aug. 9, 2017

(65) Prior Publication Data

US 2017/0337662 A1 Nov. 23, 2017

Related U.S. Application Data

(63) Continuation of application No. 14/588,216, filed on Dec. 31, 2014, now Pat. No. 9,734,553.

(51) Int. Cl.
*G06T 3/40* (2006.01)
*G06Q 30/06* (2012.01)
*G09G 5/00* (2006.01)

(52) U.S. Cl.
CPC .......... *G06T 3/40* (2013.01); *G06Q 30/0643* (2013.01); *G09G 5/00* (2013.01);
(Continued)

(58) Field of Classification Search
CPC .................. G06T 3/40; G06T 11/60
(Continued)

(56) References Cited

U.S. PATENT DOCUMENTS 5,590,268 A 12/1996 Doi et al.
9,734,553 B1 8/2017 Naware et al.
(Continued)

FOREIGN PATENT DOCUMENTS

CN 101340531 A 1/2009
CN 101676683 A 3/2010
(Continued)

OTHER PUBLICATIONS

Paquet E, Murching A, Naveen T, Tabatabai A, Rioux M (2000) Description of shape information for 2-D and 3-D objects. Signal Process Image Commun 16:103-122.*

(Continued)

*Primary Examiner* — Jin Ge
(74) *Attorney, Agent, or Firm* — Maschoff Brennan

(57) ABSTRACT

Methods and systems generate and project an actual sized image of an object. An object or a representation of an object may be pre-processed. The pre-processing of a representation of the object may include determining pixels that belong to the object and pixels that belong to a background of the image. The pre-processing may include calculating a bounding box for the object. The projection may include determining an area of projection suitable for the bounding box of the object. The projection may further include projecting an image of intermediate dimensions. The projection may further include up-sampling or down-sampling the image to an actual size. The projection of the actual sized image may be made interactive by rendering at least one additional view of the object.

19 Claims, 9 Drawing Sheets

(52) U.S. Cl.
CPC ............... *G09G 2340/0407* (2013.01); *G09G 2340/0414* (2013.01); *G09G 2340/0421* (2013.01); *G09G 2340/0492* (2013.01); *G09G 2340/145* (2013.01)

(58) Field of Classification Search
USPC .......................................................... 345/666
See application file for complete search history.

(56) References Cited

U.S. PATENT DOCUMENTS

| | | | |
|---|---|---|---|
| 2008/0284800 A1* | 11/2008 | Ross | G06F 3/04845 345/661 |
| 2009/0009511 A1* | 1/2009 | Ueda | H04N 5/4401 345/419 |
| 2012/0223945 A1* | 9/2012 | Ernvik | G06T 15/08 345/424 |
| 2013/0113701 A1* | 5/2013 | Sasaki | G06T 15/20 345/156 |
| 2014/0015954 A1 | 1/2014 | Tsujimoto et al. | |
| 2014/0098244 A1* | 4/2014 | Ghazizadeh | H04N 5/44508 348/189 |
| 2014/0218409 A1* | 8/2014 | Kawatani | G06T 11/00 345/670 |
| 2014/0368456 A1* | 12/2014 | Sakai | G06F 3/0488 345/173 |
| 2015/0339832 A1 | 11/2015 | Huang | |

FOREIGN PATENT DOCUMENTS

| | | |
|---|---|---|
| CN | 102724398 A | 10/2012 |
| CN | 104040463 A | 9/2014 |
| EP | 2804372 A1 | 11/2014 |
| JP | 2002199358 A | 7/2002 |
| KR | 20140024750 A | 3/2014 |
| WO | 2007126260 A1 | 11/2007 |

OTHER PUBLICATIONS

RoomSketcher, choosing Metrix vs US (imperial) units, May 31, 2013, https://www.youtube.com/watch?v=fcNYFz8Xm4E.*
International Search Report and Written Opinion, as issued in connection with International Patent Application No. PCT/US2015/060867, dated Jan. 22, 2016, 12 pgs.
RoomSketcher, Choosing Metric vs US (Imperial) Units, https://www.youtube.com/watch?v=fcNYFz8Xm4E, May 31, 2013, 4 pgs.
"Life Sizer", www.lifesizer.com, retrieved on Oct. 13, 2015, 2 pgs.
Communication received for European Patent Application No. 15802283.0, dated Sep. 20, 2017, 2 pgs.
Response to Communication filed Mar. 6, 2018 for European Patent Application No. 15802283.0, dated Sep. 20, 2017, 15 pgs.
Non-Final Office Action received for U.S. Appl. No. 14/588,216, dated Aug. 12, 2016, 28 pgs.
Applicant Initiated Interview Summary received for U.S. Appl. No. 14/588,216, dated Nov. 1, 2016, 3 pgs.
Response to Non-Final Office Action filed Nov. 14, 2016 for U.S. Appl. No. 14/588,216, dated Aug. 12, 2016, 11 pgs.
Notice of Allowance received for U.S. Appl. No. 14/588,216, dated Jan. 20, 2017, 15 pgs.
Notice of Allowance received for U.S. Appl. No. 14/588,216, dated Apr. 11, 2017, 13 pgs.
Office Action received for Korean Patent Application No. 10-2017-7017947, dated Sep. 17, 2018, 6 pgs.
Office Action received for Chinese Patent Application No. 201580072092.7, dated Sep. 18, 2018, 10 pgs.
Response to Korean Office Action, for Korean Patent Application No. 10-2017-7017947, filed Nov. 16, 2018, 7 pgs.
Response to Chinese Office Action, for Chinese Patent Application No. 201580072092.7, filed Feb. 2, 2019, 26 pgs.
Notice of Allowance for Korean Patent Application No. 10-2017-7017947, dated Mar. 27, 2019, 3 pgs.
Office Action received for Chinese Patent Application No. 201580072092.7, dated Jun. 10, 2019, 10 pgs.

* cited by examiner

100

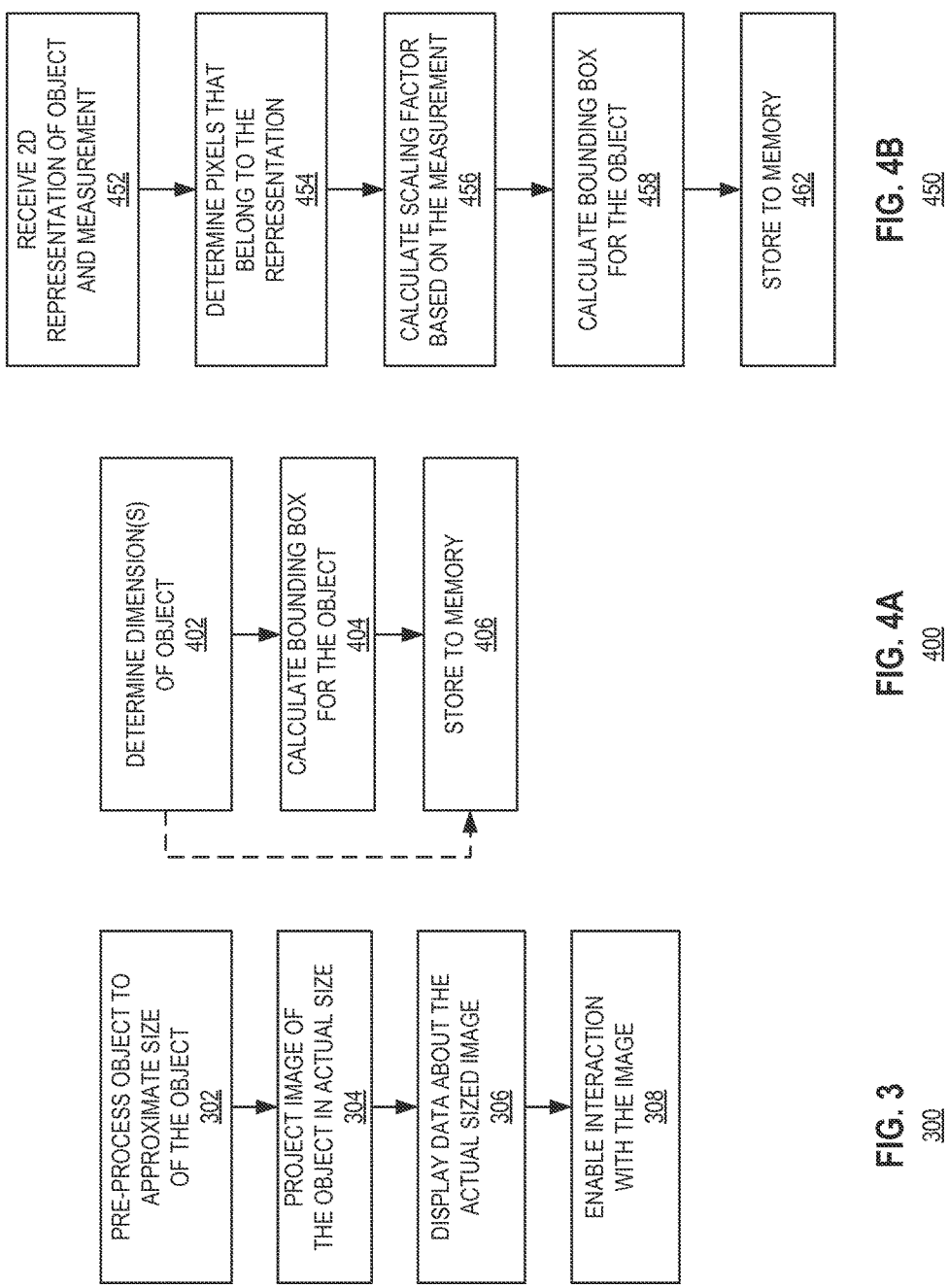

500

540

600

700

850

800

1000

900

GENERATING AND DISPLAYING AN ACTUAL SIZED INTERACTIVE OBJECT

CROSS-REFERENCE TO RELATED APPLICATIONS

This application is a continuation of U.S. patent application Ser. No. 14/588,216, filed on Dec. 31, 2014; the disclosure of which is incorporated by reference herein.

FIELD OF THE DISCLOSURE

The present disclosure relates to a method and system for displaying an image. More specifically, it relates to generating and displaying an actual sized image of a two-dimensional or three-dimensional object.

BACKGROUND

When making purchasing decisions, consumers may wish to visualize an actual size of a good and how it fits into other settings. A good may include any kind of saleable or usable item, inanimate or animate, and is not limited to a garment, an accessory, a piece of furniture, an appliance, a vehicle, a decorative object, an animal, mammal, or fish, by way of example. For example, a consumer may wish to see the relative size of a watch having a watch face and dial relative to her own wrist. As another example, a consumer may wish to visualize how a piece of furniture would fit in her living room. In a brick-and-mortar retail setting, a consumer can typically observe the actual size of the good, try it on, touch it, etc. This direct interaction with the object may influence a purchasing decision. In a typical online marketplace, it is difficult to convey and/or perceive an actual size of a good due to variations in display sizes of user devices. Accurate portrayal of an actual size of an object would facilitate adoption, penetration, and success of digital commerce. Thus, there exists a need in the art to generate and display objects in actual size.

BRIEF DESCRIPTION OF THE DRAWINGS

FIG. 3 is a flowchart of a method for generating and projecting an actual sized image according to an embodiment.

FIG. 4A is a flowchart of a method for pre-processing an object according to an embodiment.

FIG. 4B is a flowchart of a method for pre-processing a two-dimensional representation of an object according to an embodiment.

DETAILED DESCRIPTION

In an embodiment, a method to display an actual sized image of an object includes receiving a representation of the object, determining and storing a bounding box for the object, receiving a size of a display, calculating an actual height and an actual width of the object, scaling an image of the object to an actual size based on the calculated actual height and actual width, and providing a projection of the actual sized image of the object for display. Information regarding the actual sized object may also be displayed, e.g., that the displayed object is shown in actual size and dimensions of the object in various units of measurement.

Embodiments described herein may display an object in its actual size (i.e., true size, real size). In embodiments, the objects may be two-dimensional ("2D") or three-dimensional ("3D"). The screen may be a digital display. Embodiments cause display of a representation of an object in actual size regardless of a size and resolution of a screen on which the representation is displayed. That is, actual size experience may be made available on large-format screens such as digital televisions, walls, and the like, as well as on smaller-format screens such as smartphones, tablets, and the like.

In an embodiment, the actual size display may provide a "virtual fitting" of clothing and/or accessories. For instance, a garment may be displayed to a customer in its actual size. This enables the customer to assess the appropriateness of the garment size for her body or other intended use of the garment. This may be applicable to sizing rings, shoes, shirts, jackets, eye-glasses, etc. In another embodiment, the object may be printed or modeled in 2D or 3D.

Embodiments may depict an actual sized object in a setting, i.e. may show a relative size of the object compared with a reference object. For example, a side by side comparison of at least two items may be provided. An item of interest may be scaled to dimensions of another item, e.g., one of known size. For example, a coffee table may be placed in relation to other furniture or to a living space having particular dimensions.

Figure 1:
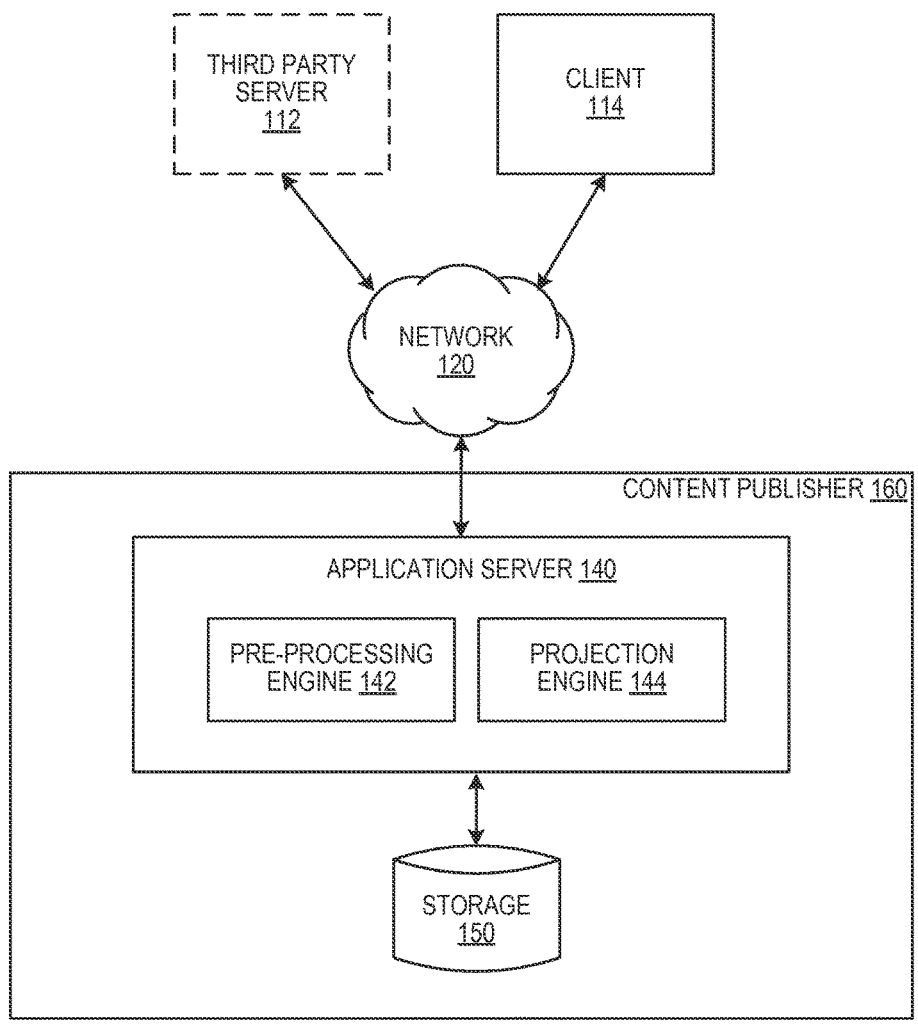
FIG. 1 is a simplified block diagram of a system according to an embodiment.

FIG. 1 is a simplified block diagram of a system 100 implementing the methods and systems described herein. The system 100 may include a content publisher 160 and a client 114. In an embodiment, the system may include a third party server 112. Each element of the system 100 may exchange data via a network 120. The content publisher 160 may publish content gathered, generated, or derived from the elements of the system. The client 114 may represent a user or be controlled by a user to provide and receive data from the content publisher 160.

The content publisher 160 may include an application server 140 and storage 150. The content publisher 160 may include a data exchange platform such as a virtual marketplace. The virtual marketplace may host transactions such as purchasing and selling goods and services including auctions. The data exchange platform may also host processes assisting the transactions such as generating recommendations, synchronizing financial journals, distribution of goods, collection, and payment.

The application server 140 may include a pre-processing engine 142 and a projection engine 144. The application server 140 may be communicatively coupled to storage 150. Each of pre-processing engine 142 and the projection engine 144 may be operated according to the methods described herein. For example, the pre-processing engine 142 may perform one or more of the methods shown by way of example in FIGS. 3, 4A, and 4B, and the projection engine 144 may perform one or more of the methods shown by way of example in FIGS. 3, 6, and 9.

The network 120 may include any wired connection, wireless connection, or combination thereof, a non-exhaustive list including: LAN (local area network), WAN (wide area network), VPN (virtual private network), cellular network, satellite network, Wi-Fi network, optical network, the Internet, and a Cloud network. The network 120 may use any combination of transmission protocols or techniques.

Storage 150 may include individual storage units or storage systems, any permanent memory circuit, temporary memory circuit, or combination thereof, a non-exhaustive list including: ROM (read-only memory), RAM (random access memory), EEPROM (electrically erasable programmable read-only memory), Flash memory, CD (compact disk), DVD (digital versatile disk), and hard disk drive.

The system 100 is an illustrative system having a client-server architecture. The system may be embodied in other types of architectures, including, but not limited to peer-to-peer network environments and distributed network environments.

Figure 2:
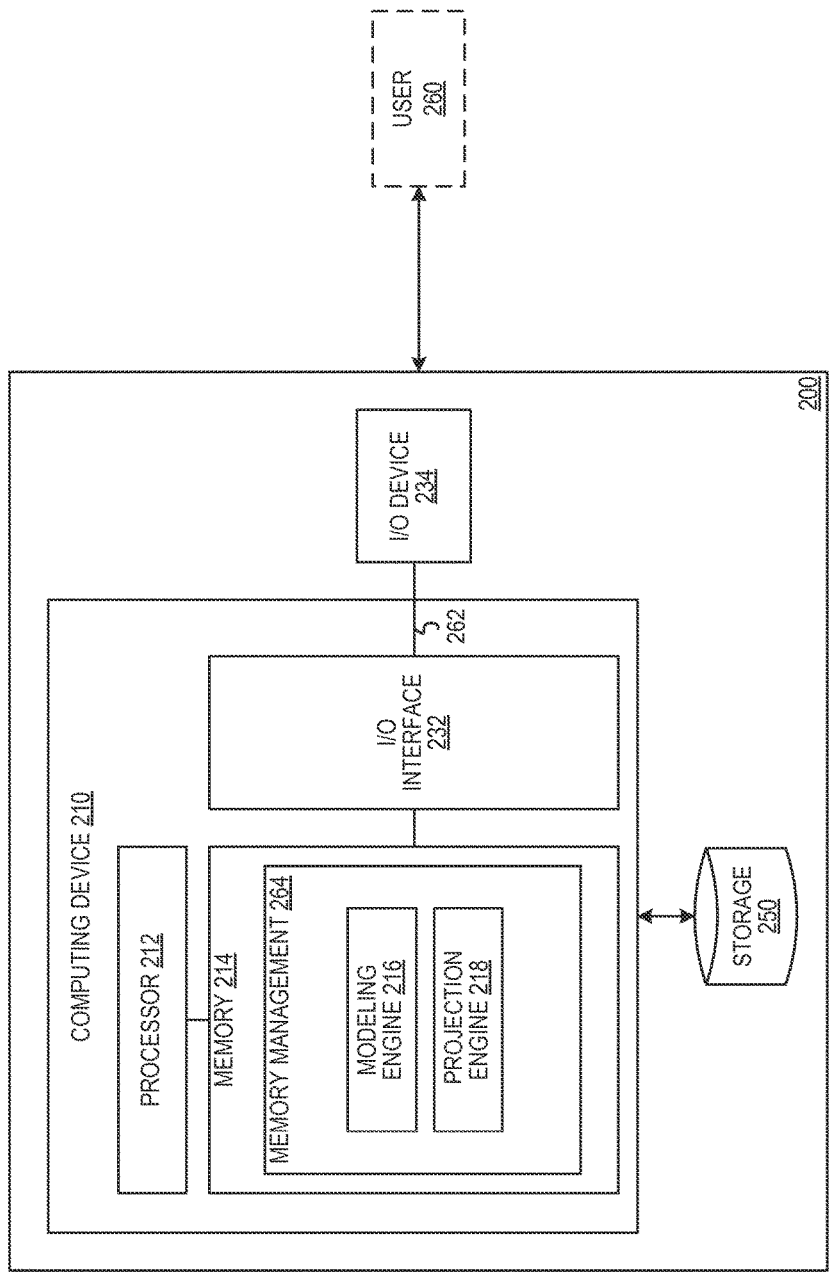
FIG. 2 is a simplified block diagram of a device according to an embodiment.

FIG. 2 is a simplified block diagram of a device 200 for implementing the methods and systems described herein. The device may be a server system or a client system. The device may include a computing device 210, an I/O (input/output) device 234, and storage 250. The computing device may include a processor 212, memory 214, and an I/O interface 232. Each of the components may be connected via a bus 262.

The processor 212 executes computer program code, for example code stored in memory 214 or storage 250. The execution of the code may include reading and/or writing to/from memory system 214, storage system 250, and/or I/O device 234. The program code may execute the methods described herein.

The memory 214 may include, or may work in conjunction with memory management system 264. The memory management system may include a modeling engine 216 and a projection engine 218. The modeling engine 216 may be configured to make computing device 210 operable to generate an object such as a 2D or 3D object. The modeling engine may implement the methods described herein, e.g., in relation to FIGS. 3, 4A, and 4B. The projection engine 218 may be configured to make computing device 210 operable to project actual sized images of objects. The projection engine may implement the methods described herein, e.g., in relation to FIGS. 3, 6, and 9.

One of ordinary skill in the art would understand that modeling engine 216 and/or projection engine 218 need not be part of memory management system 264, but instead may be separate modules or elements. One of ordinary skill in the art also would understand that a different number of engines than the ones shown may be included in memory 214 (or provided separately). The functionality described for each engine may also be apportioned to different engines. Additional engines are also possible. For example, a billing engine may be configured to charge a vendor for at least some of the information stored in storage 250 or memory 214. The billing engine may be further configured to charge vendors for displaying an actual sized image of a product at a particular time and/or location.

The memory 214 may include local memory usable during execution of program code, cache memory temporarily storing program code, and bulk storage. The local memory may include any permanent memory circuit, temporary memory circuit, or combination thereof, a non-exhaustive list including: ROM, RAM, EEPROM, Flash memory, CD, DVD, and hard disk drive.

The I/O device 234 may include any device enabling a user to interact with the computing device 210, including but not limited to a keyboard, pointing device such as a mouse, touchscreen, microphone, speaker system, computer display, and printer.

The computing device 210 may include any special purpose and/or general purpose computing article of manufacture executing computer program code, including, but not limited to, a personal computer, a smart device such as a smartphone or tablet, and a server. The computing device may be a combination of general and/or specific purpose hardware and/or program code.

The device 200 may be embodied as a single server or a cluster of servers including at least two servers communicating over any type of communications link. A communications link may include any wired connection, wireless connection, or combination thereof, a non-exhaustive list including: LAN (local area network), WAN (wide area network), VPN (virtual private network), cellular network, satellite network, Wi-Fi network, optical network, the Internet, and a Cloud network. The communications link may use any combination of transmission protocols or techniques.

An actual sized image may be created from an actual object or from a representation of an object. Some embodiments include generating and projecting an actual sized image based on a 3D object or a 2D image with at least one measurement. Objects for which an actual sized image may be projected include but are not limited to: apparel such as jeans, blouses, dresses, and coats; shoes; accessories such as handbags, watches, and jewelry; home furnishings and decorations such as sofas, tables and beds; motor vehicles, including parts and accessories associated with motor vehicles; and reading material such as books. This list is not intended to be exclusive. Other possible objects are mentioned above.

The projection may include a projection by graphical projection techniques. In an embodiment, the projection may be an orthographic projection. An orthographic projection may depict an object using various views of the object, including from the left, right, top, bottom, front, and back. The graphical projection techniques may represent a 3D object in 2D by allowing for a 3D object to be projected onto a planar surface. In alternative embodiments, the project may be by one or more other graphical projection techniques including, but not limited to: auxiliary projection, isometric projection, oblique projection, and perspective projection.

FIG. 3 is a flowchart of aspects of a method 300 for generating and projecting an actual sized image of an object. In box 302, the method 300 may pre-process the object to approximate a size of the object. In an embodiment, the method 300 may pre-process an actual object, which may be 3D or substantially 2D. In another embodiment, the method 300 may pre-process a representation of the object. In box 304, the method 300 may then project an image of the object in actual size based on the approximation made in box 302. The projection may be effected by the graphical projection techniques described herein. The method 300 may display information regarding the actual sized image (box 306). The method 300 may render at least one view of the actual sized image of the object to enable interaction with the image such as panning, zooming, tilting, and the like (box 308). The pre-processing (box 302) may be performed by a pre-processing engine 142 shown in FIG. 1 or a modeling engine 216 shown in FIG. 2. The projection, data display, and rendering for interaction (boxes 304, 306, and 308) may be performed by a projection engine 144 shown in FIG. 100 or a projection engine 218 shown in FIG. 2.

In box 306, the method 300 may display information about the actual sized image projected in box 304. In an embodiment, the display may include an indication that the projection being displayed is shown in actual size. In another embodiment, the actual dimensions may be displayed. The dimensions may be those calculated and/or determined, e.g., in box 402 of method 400. For example, dimensions in inches may be displayed along with the object. In another embodiment, the display may include dimensions in various units of measurement. In yet another embodiment, the display may include graphical user interface elements for conversion between different units of measurement. For example, the display may allow for conversion between inches and centimeters. The conversion may be carried out according to conventional conversion factors. This may facilitate trade between regions using different units of measurement or in cross-border trade, e.g., shoe sizing. For example, a consumer may become familiarized with sizing of a product produced by a manufacturer whose native unit of measurement is different from that used by the consumer.

FIG. 4A is a flowchart of a method 400 for pre-processing an object. Method 400 may be performed as part of another method such as box 302 in method 300. In box 402, the method 400 may determine at least one dimension of the 3D object. An object typically has dimensions in 3D space. The dimensions may be measurable. For example, a pair of pants may have an outseam, an inseam, a waist measurement, etc. As another example, a piece of jewelry may have a length, a radius, a circumference, etc. Other articles will have two or three dimensions of interest (e.g. length, width, height) For example, an object may be scanned or measured to determine its dimension(s). In an embodiment, the method 400 may define which dimensions to measure. Dimensions defined for measurement may be referred to as "salient" measurements. The salient measurements may be provided by a manufacturer, vendor, or third party.

Figure 5A:
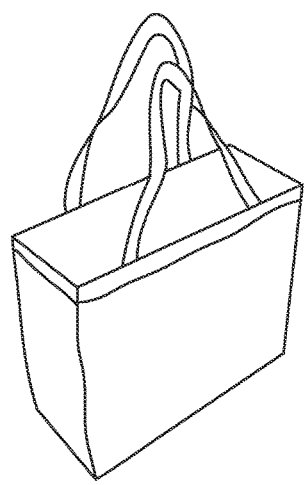
FIG. 5A shows a three-dimensional object based on which an actual sized image may be generated and projected according to an embodiment.

In box 404, the method 400 may calculate a bounding box to approximate the dimensions of the object. A bounding box may be an approximation of a size and shape of an object such that each point of an object is within a range defined by the bounding box. Some objects such as object 500 shown in FIG. 5A, are not symmetrical or have irregular shapes. The approximate size of such objects may be stored in memory as a bounding box. Memory may be conserved because fewer datapoints are stored compared with storing each dimension of an irregularly sized object. In box 406, the method 400 may store the bounding box to memory. Optionally, the method 400 may store the dimension(s) of the object determined in box 402 to memory in addition to or as an alternative to the bounding box calculated in box 404.

Figure 5B:
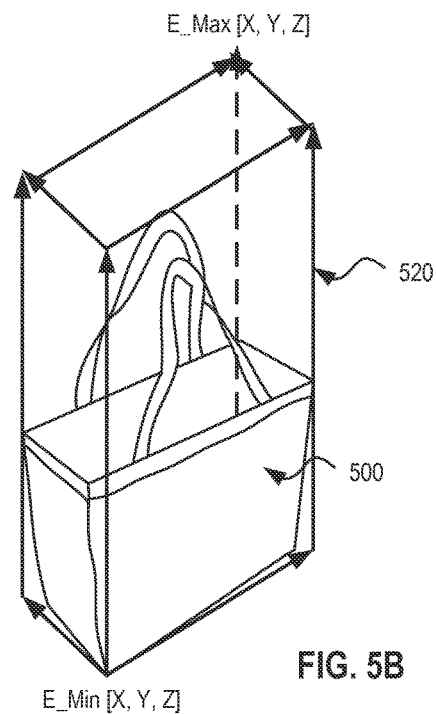
FIG. 5B is a diagram of a bounding box for an object according to an embodiment.

FIG. 5A is a diagram of a 3D object 500, based on which an actual sized image may be generated and projected. FIG. 5B is a diagram of a bounding box 520 for the 3D object 500. In the examples provided, an object may be referred to as "E" for simplicity. The bounding box 520 of object 500 may be mathematically represented as a range, E_Min[X, Y, Z] to E_Max[X, Y, Z] such that each point of the actual object, E, is within the range. For example, the value for each dimension of the bounding box, X, Y, Z, may be determined from the largest measurement in each of the X, Y, and Z directions. In an embodiment, the bounding box may be axis-aligned such that E_Min is aligned with the origin, i.e., E_Min[X, Y, Z]=(0, 0, 0). In the axis-aligned case, only the E_Max[X, Y, Z] coordinates may be stored to memory. This may further conserve memory usage. For example, box 404 of method 400 may include including the X, Y, and Z values and or performing axis-alignment. Box 406 of method 400 may include storing the E_Min[X, Y, Z] and/or E_Max[X, Y, Z] coordinates to memory.

Figure 5C:
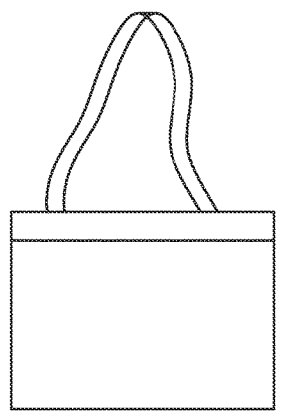
FIG. 5C is a diagram of a two-dimensional object based on which an actual sized image may be generated and projected according to an embodiment.

FIG. 5C is a diagram of a 2D object 540 based on which an actual sized image may be generated and projected. For a 2D object, one of the dimensions may be zero. For example, E_Max[X, Y, Z]=(X, Y, 0). In an embodiment, E_Max [X, Y, Z] may be stored as three float values with an implicit unit of measurement such as inches, centimeters, etc. Alternatively, the unit of measurement may be stored along with the bounding box. A representation of the object may also be stored, for example a 3D mesh or a photograph of the object.

FIG. 4B is a flowchart of a method 450 for pre-processing a representation of an object. Method 450 may be performed as part of another method such as box 302 in method 300. In box 452, the method 450 may receive a representation of an object. The representation may be an image or photograph of the object. For example, a user may upload an image or photograph of an object. An image captured by a camera is typically a projected image of the object on an image plane of the camera. The method 400 may then determine pixels that belong to the representation in box 454. In box 456, the method 400 may calculate a scaling factor based on any received measurements. The method 400 may then approximate dimension(s) of the object (box 458). The method 400 may store the approximate dimensions to memory or storage in box 462.

The representation of the object may include the object set against a background such as a background of a solid color. Alternatively, a background may appear as transparent pixels. In box 454, the method 450 may separate pixels that belong to the object from pixels that belong to the background of the representation of the object. Image blending techniques may be used to separate pixels that belong to the object and pixels that do not. For example, some pixels may belong to a background instead of an object itself. The image blending techniques may be used during projection. The image blending techniques may be used to preserve an original background, render a background white, etc.

The method 400 may then calculate a bounding box of the object (box 458). For example, the method 400 may calculate a range E_Min to E_Max for the pixels belonging to the representation of the object (and not the background) such that each pixel coordinate is within E_Min to E_Max. The method 400 may optionally translate the pixel coordinates by −Min[X, Y, Z], i.e., mathematically subtract E_Min to obtain a bounding box aligned with an origin (0, 0, 0).

In an embodiment, dimensional information may be provided. For example, a length, width, and height of a shoe may be provided, from which a bounding box of size Max [length, width, height] may be calculated.

Although a color of the image and lighting conditions at the time of image capture may provide hints about the size of the object, it can be difficult to compute an actual size of the object without additional information. The additional information may include a measurement or sizing relative to a reference object. In an embodiment, the method 450 may receive measurements along with the 2D representation in box 452. The measurements may be measurements characterizing the object. The measurements may be pre-defined such as "salient" measurements. The salient measurements may be provided by a manufacturer, vendor, or third party. The additional information may be used by the method 450 to compute a scaling factor based on features of the object (box 456). For example, if a length of a sleeve of a shirt is known, then the actual size of the object may be calculated.

In an alternative embodiment, the representation may include the object positioned relative to a reference object of known size. A scaling factor may then be calculated based on the reference object.

In another embodiment, the method 450 may receive a size chart with a 2D representation in box 452. The method 450 may calculate the scaling factor in box 456 by computing a length in pixels of a dimension. For example, the method 450 may receive a 2D representation 540 of an object 500 along with a measurement of a handle drop length A and a bag height B. The method 450 may then determine a corresponding length in another unit of measurement (such as inches, centimeters, etc.). In the example of a 2D representation 540, the handle drop length A may be 9 inches and the bag height A may be 10 inches. The image may then be scaled up to the actual size of the object by using a scaling factor, where the scaling factor is defined by: (length in inches)/(length in pixels). The size chart information or analogous information may be provided by a manufacturer, vendor, or third party, for example in a catalog.

Figure 6:
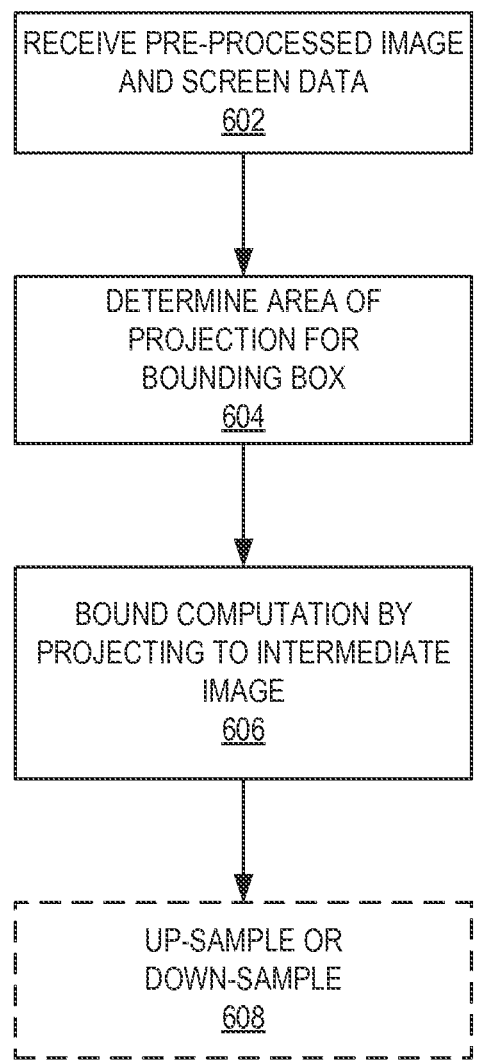
FIG. 6 is a flowchart of a method for projecting an actual sized image according to an embodiment.

FIG. 6 is a flowchart of a method 600 for projecting an actual sized image. In box 602, the method 600 may receive or retrieve a pre-processed image and screen data. The image may be pre-processed according to the methods described herein, e.g., in relation to FIGS. 3, 4A, and 4B. The screen information may include information about the display on which the actual sized image is to be projected. The screen may be a single display or may be made up of multiple displays. The method 600 may receive screen data such as a width in pixels ("WS"), height in pixels ("HS"), and pixels per inch of the screen ("DPI_S"). According to the example, a total displayable width of the screen ("TWS") may be represented in inches as TWS=WS*DPI_S. A total displayable height of the screen ("THS") may be represented in inches as THS=HS*DPI_S.

Figure 8B:
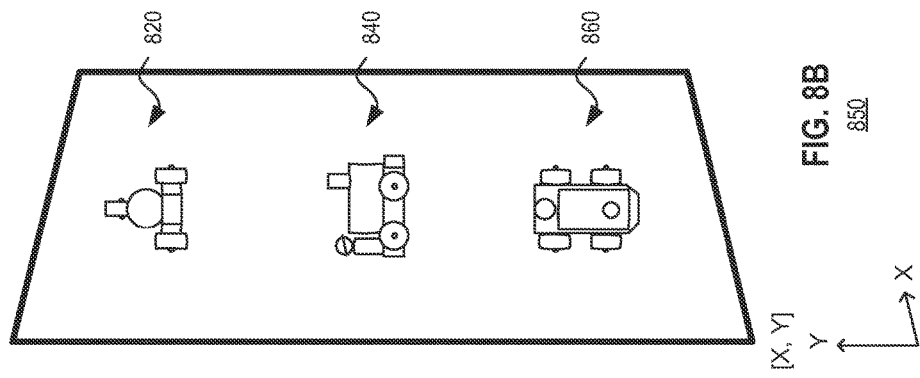
FIG. 8B shows a projection according to an embodiment.
Figure 8A:
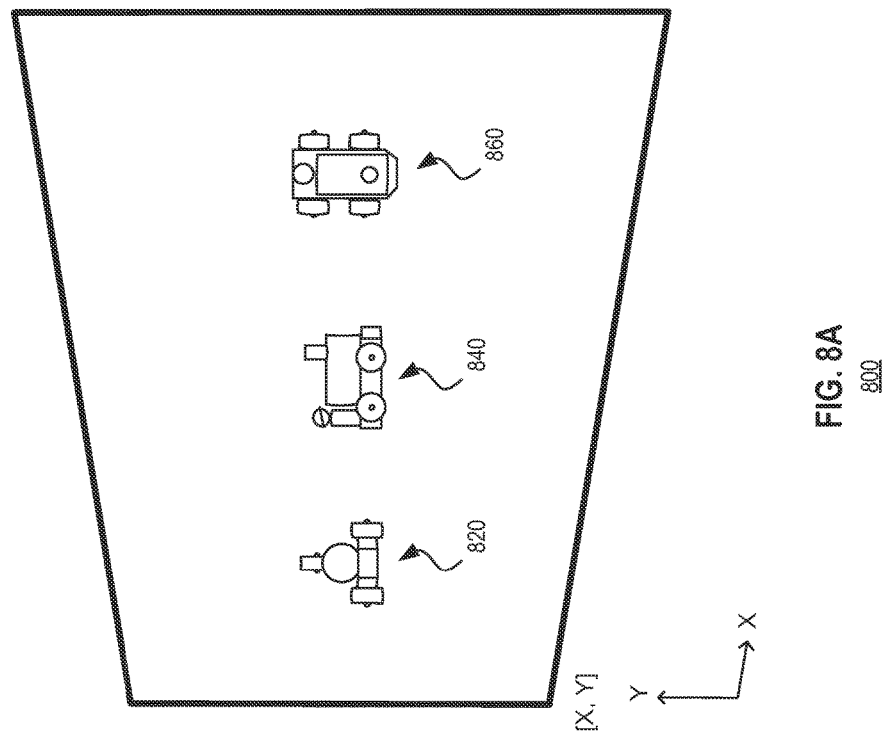
FIG. 8A shows a projection according to an embodiment.

In box 604, the method 600 may determine an area within which to project the actual sized image. The area may be determined as follows. Let origin [X, Y], shown in FIGS. 8A and 8B represent a point starting from which the actual-sized object is to be displayed. The directional axes are represented by X, a horizontal direction, and Y, a vertical direction. The projection may be orthographically projected to the Z-plane. An actual height of a bounding box, which may be an approximation of the size of the object, may be E_Max [Y] in inches, which corresponds to E_Max[Y]*DPI_S pixels on the screen. The actual width of the bounding box may be E_Max[X] in inches, which corresponds to E_Max [X]*DPI_S pixels on the screen. To fall within the bounds of the screen, Origin [X, Y]+[(E_Max [X]*DPI_S), (E_Max [Y]*DPI_S)] is less than or equal to [TWS, THS].

In box 606, the method 600 may bound a computation by projecting to an image of intermediate dimension. The image of intermediate dimension may be of a size different from an actual size of the image. For example, the intermediate dimension may preserve an aspect ratio. For example, for a screen of resolution 1920 pixels by 1280 pixels, the intermediate dimension may be [1920, 1280*E_Max [Y]/E_Max[X]]. In an embodiment, the image of intermediate dimensions may be output to a display driver. A display driver may be configured to receive the image of intermediate dimension and project the actual sized image. Optionally, the method 600 may proceed to box 608 in which the method 600 may up-sample or down-sample the image to a final projected size of [E_Max[X]*DPI_S, E_Max[Y]+ DPI_S] pixels. In an embodiment, the up-sampling or down-sampling may be performed by an external device, such as the recipient device of the image of intermediate dimensions.

Figure 7B:
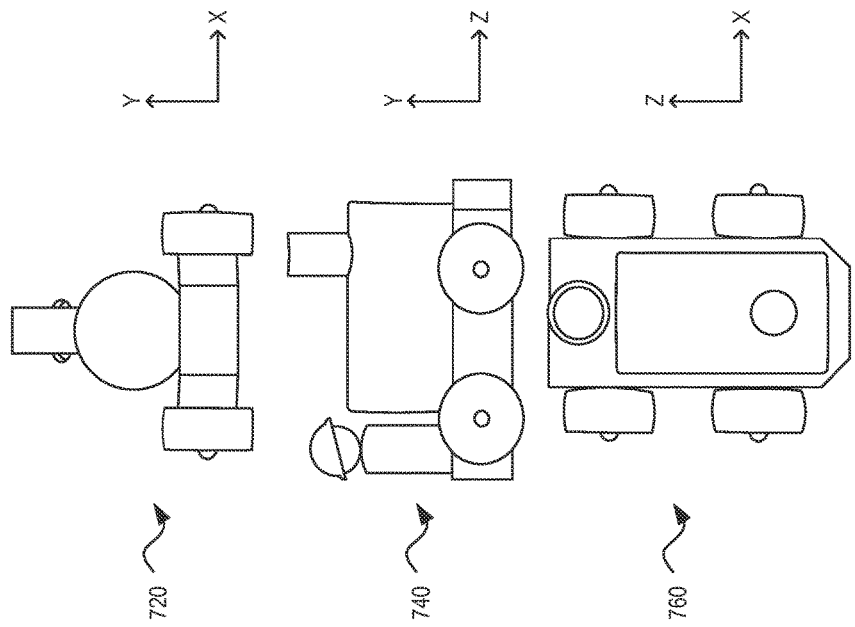
FIG. 7B is a diagram of views of projection according to an embodiment.
Figure 7A:
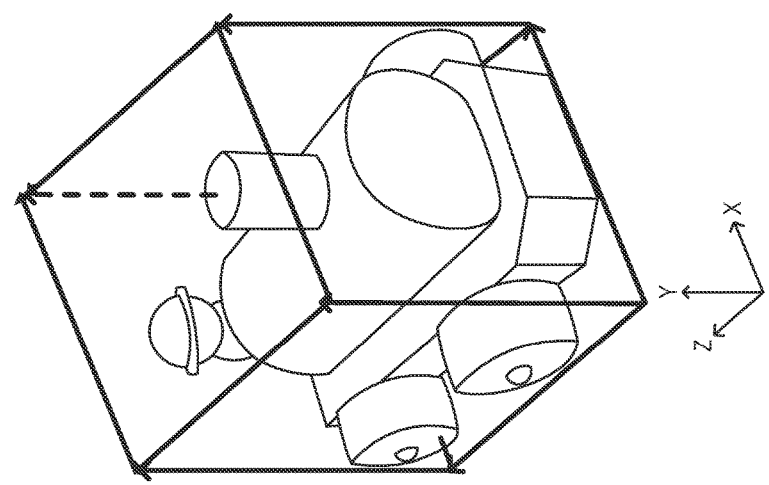
FIG. 7A shows an actual sized object with labeled dimensional information according to an embodiment.

FIG. 7A shows an actual sized object 700 with labeled dimensional information. FIG. 7B is a diagram of views 720, 740, and 760 of a projection of the actual sized object 700. FIG. 7B illustrates projections according to an orthographic projection technique. The object 700 is shown in three dimensions: X, Y, and Z in FIG. 7A. For discussion purposes, suppose the figure wearing the hat is positioned in the "back" of the train. View 720 is a front view, i.e., in the X-Y plane. View 740 is a left side view, i.e., in the Y-Z plane. View 760 is a top view, i.e., in the X-Z plane. According to the methods described herein, each of the views may be displayed in their actual size regardless of screen type or size.

FIG. 8A shows a projection 800 according to an embodiment. In projection 800, the screen is longer in the X-direction than in the Y-direction. Projection 820 is a front view, projection 840 is a side view, and projection 860 is a top view. Each of these views may be generated and projected according to the steps described in method 600.

FIG. 8B shows a projection 850 according to an embodiment. In projection 850, the screen is longer in the Y-direction than in the X-direction. Projection 820 is a front view, projection 840 is a side view, and projection 860 is a top view. Each of these views may be generated and projected according to the steps described in method 600.

Figure 10:
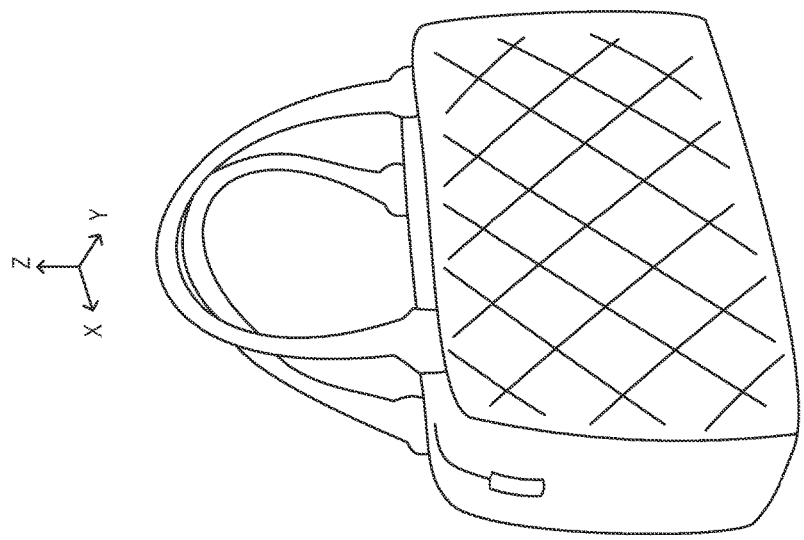
FIG. 10 is a diagram of an interactive actual sized image according to an embodiment.
Figure 9:
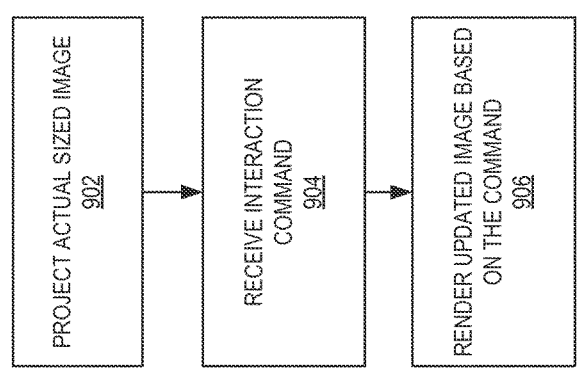
FIG. 9 is a flowchart of a method for projecting an interactive actual sized image according to an embodiment.

In an embodiment, an actual sized image may be interactive. For example, a user may choose a viewing direction and/or angle for the object, rotate, pan, tilt, etc. The object may be an actual sized object in any specified view. FIG. 9 is a flowchart of a method 900 for projecting an interactive actual sized image. In box 902, the method 900 may project an actual sized image of an object. For example, the method 900 may project the image according to the steps described in method 600. In box 904, the method 900 may receive an interaction command, for example, rotate, pan, tilt, or the like. The command may be provided via a user interface such as a button, a slider bar, etc. For example, the object may be rotated about any axis X, Y, Z shown in FIG. 10. FIG. 10 is a diagram of an interactive actual sized image 1000. In box 906, the method 900 may render an updated image based on the command received in box 904. The updated image may be rendered according to a projection matrix. One of ordinary skill in the art would understand that a projection matrix may be generated according to techniques in the art. For example, a projection matrix may be defined as:

$$\begin{bmatrix} a((v^2+w^2)-u(bv+cw-ux-vy-wz))(1-\cos\theta) + \\ x\cos\theta + (-cv+bw-wy+vz)\sin\theta \\ b((u^2+w^2)-v(au+cw-ux-vy-wz))(1-\cos\theta) + \\ y\cos\theta + (cu-aw+wx-uz)\sin\theta \\ c((u^2+v^2)-w(au+bv-ux-vy-wz))(1-\cos\theta) + \\ z\cos\theta + (-bu+av-vx+uy)\sin\theta \end{bmatrix}$$

In the example provided above, the projection matrix is a 3×1 matrix. When applied to a point (x, y, z), the matrix gives the result of rotating (x, y, z) about a line passing though (a, b, c) in a direction (u, v, w). The direction may be a normalized direction, i.e., so $u^2+v^2+w^2=1$ by an angle θ. Based on the projection matrix, the first two coordinates may be a projected point, i.e., a direction vector. That is, the Z dimension may be effectively removed so that the projection is in an XY plane after rotation.

The interactive view of the actual sized image may be projected in a continuous mode so that the effect of the panning, tilting, rotating, etc. appears smooth. By changing viewing directions, a user may obtain a better understanding of a size and features of an object. For example, some objects may be asymmetrical or may look different from different angles.

Figure 11A:
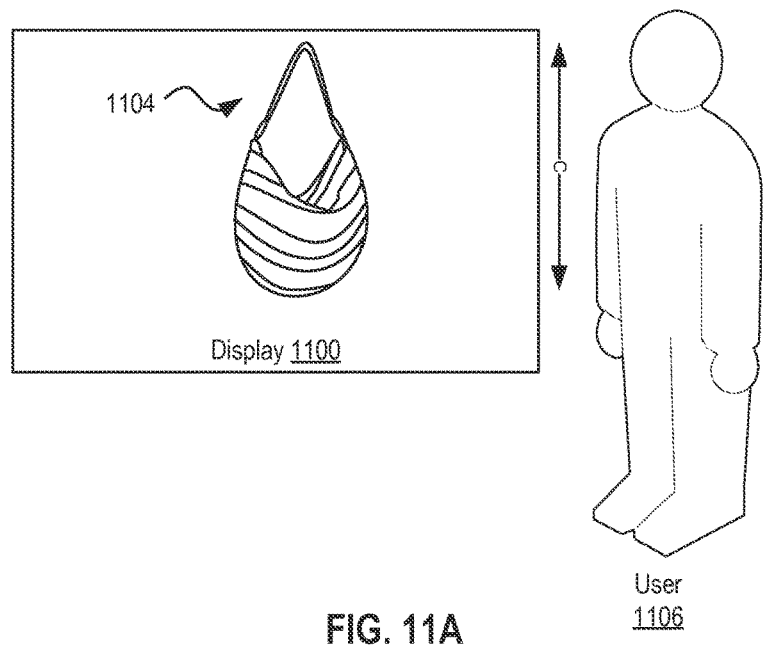
FIG. 11A is a diagram of an interactive actual sized image projected on a display according to an embodiment.

FIG. 11A is a diagram of an interactive actual sized image 1104 of an object shown on a display 1100. For example, the display 1100 may be a television. The actual sized image 1104 may be generated and projected according to the techniques discussed herein. A user 1106 may perceive the size of object 1104, which is a purse, relative to her own size. For example, the user may imagine an overall length C of the purse (including the purse's body length and strap length) and visualize where the purse will fall on her own body. The display 1100 may also provide a graphical user interface (not shown) to interact with the object 1104. For example, the object may be made interactive according to the methods described herein.

Figure 11B:
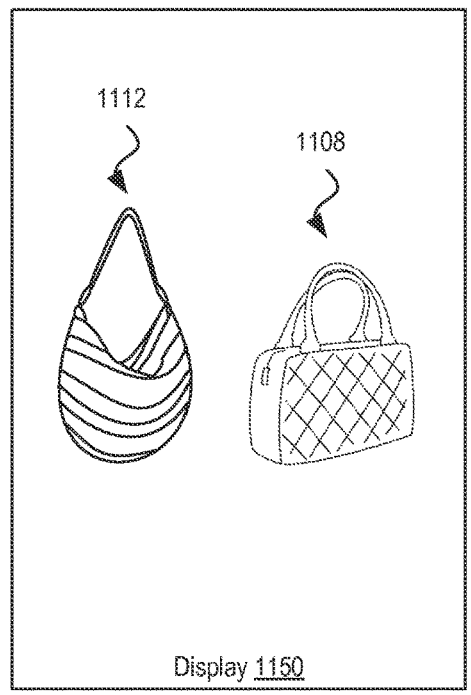
FIG. 11B is a diagram of an interaction relative sized image projected on a display according to an embodiment.

FIG. 11B is a diagram of an interactive relative sized image 1112 of an object shown on a display 1150. For example, the display may be a smartphone or tablet screen. The relative sized image 1112 may be generated and projected according to the techniques discussed herein. A user may perceive the size of image 1112, which is a purse, relative to an image of an object of known size 1108. For example, the user may already be familiar with the purse in image 1108 and how it fits with the user. By viewing image 1112 relative to the purse in the image 1108, the viewer may visualize how the purse in image 1112 will look when she is wearing it. Other objects of known relative size to the user may be represented in image 1108 as well, including for example an image or other depiction of an individual with proportions (height, torso length, leg length, etc.) similar to those of the user. The display 1100 may also provide a graphical user interface (not shown) to interact with the purse in image 1112. For example, the object may be made interactive according to the methods described herein.

As discussed herein, the projections may be by graphical projection techniques to project a 3D object onto a planar surface. For example, the projection may be an orthographic projection, which may represent a 3D object in two dimensions. Other projection techniques are also possible. For example, a perspective projection may be used. If perspective projection is used, the projection may be further scaled by a foreshortening factor. The scaling by the foreshortening factor may preserve a length of the object. The foreshortening factor may be (F+L)/f, where f is a focal length of a camera used to capture a representation of the object and L may be a distance of a bounding box from a projection point, e.g., from an eye.

The framework discussed above is analogously applicable to 2D objects. For example, one of the dimensions, e.g., the Z dimension, may be zero. Although the examples provided herein use inches and pixels as units of measurement, one or ordinary skill in the art would understand that other units of measurement such as centimeters may be used. Although described with respect to a local processor, one of ordinary skill in the art would understand that the methods described herein may be performed by shared resources, e.g., on a cloud network.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that embody marketplace and/or product placement systems. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

What is claimed is:

1. A method to present an actual sized image, the method comprising:
    obtaining a photographic representation of an object and a first dimensional measurement of the object;
    determining a bounding box for the object, the bounding box having dimensions along length X, height Y, and depth Z axes, at least one of the dimensions corresponding to the first dimensional measurement, the bounding box based on pixels in the photographic representation that belong to the object in the photographic representation;
    obtaining a size of a display, the size represented by pixels per inch of the display;
    calculating a scaling factor, wherein the scaling factor is calculated based on a size of a second object positioned relative to the object in the photographic representation, the first dimensional measurement, and the size of the display;
    calculating a second dimensional measurement of the object based on the height Y of the bounding box and the scaling factor;
    calculating a third dimensional measurement of the object as based on the length X of the bounding box and the scaling factor;
    up-sampling or down-sampling the photographic representation to a projected size based on the second and third dimensional measurements; and
    presenting at least a portion of the up-sampled or down-sampled photographic representation.

2. The method of claim 1, wherein the bounding box is represented as a range between a set of minimum coordinates and a set of maximum coordinates such that each point on the object is within the range, wherein each coordinate is a representation of a dimension.

3. The method of claim 1, further comprising performing at least one of: (i) indicate that the up-sampled or down-sampled photographic representation is actual-sized, and (ii) present the calculated second dimensional measurement and third dimensional measurement of the object.

4. The method of claim 3, further comprising, responsive to a request for conversion between a first unit of measurement to a second unit of measurement, presenting the calculated second dimensional measurement and third dimensional measurement of the object in the second unit of measurement.

5. The method of claim 1, wherein at least the portion of the presented up-sampled or down-sampled photographic representation includes an orthographic projection of the object.

6. The method of claim 1, further comprising generating an image of intermediate dimensions prior to up-sampling or down-sampling the image, wherein the image of intermediate dimensions preserves an aspect ratio of the object.

7. The method of claim 1, further comprising rendering a view of the up-sampled or down-sampled photographic representation responsive to a request for at least one of a viewing direction and an orientation.

8. The method of claim 1, wherein the scaling factor is calculated based on a sizing chart by calculating a length in pixels of the object and a corresponding actual length of the object.

9. The method of claim 1, further comprising presenting representation of a second object of a known size proximate the up-sampled or down-sampled photographic representation, the second object presented in an actual size of the known size.

10. The method of claim 1, wherein obtaining the first dimensional measurement of the object includes scanning the object to determine the first dimensional measurement.

11. A non-transitory computer-readable medium containing instructions that, when executed by one or more processors, cause a machine to perform or control performance of operations, the operations comprising:
    obtain a photographic representation of an object and a first dimensional measurement of the object;
    determine a bounding box for the object, the bounding box having dimensions along length X, height Y, and depth Z axes, at least one of the dimensions corresponding to the first dimensional measurement, the bounding box based on pixels in the photographic representation that belong to the object in the photographic representation;
    obtain a size of a display, the size represented by pixels per inch of the display;
    calculate a scaling factor, wherein the scaling factor is calculated based on a size of a second object positioned relative to the object in the photographic representation, the first dimensional measurement, and the size of the display;

calculate a second dimensional measurement of the object as based on the height Y of the bounding box and the scaling factor;

calculate a third dimensional measurement of the object based on the length X of the bounding box and the scaling factor;

up-sample or down-sample the photographic representation to a projected size based on the second and third dimensional measurements; and present at least a portion of the up-sampled or down-sampled photographic representation.

12. The computer-readable medium of claim 11, wherein the bounding box is represented as a range between a set of minimum coordinates and a set of maximum coordinates such that each point on the object is within the range, wherein each coordinate is a representation of a dimension.

13. The computer-readable medium of claim 11, wherein the operations further comprise perform at least one of: (i) indicate that the up-sampled or down-sampled photographic representation is actual-sized, and (ii) present the calculated second dimensional measurement and third dimensional measurement of the object.

14. The computer-readable medium of claim 13, wherein the operations further comprise, responsive to a request for conversion between a first unit of measurement to a second unit of measurement, present the calculated second dimensional measurement and third dimensional measurement of the object in the second unit of measurement.

15. The computer-readable medium of claim 11, wherein at least the portion of the presented up-sampled or down-sampled photographic representation includes an orthographic projection of the object.

16. The computer-readable medium of claim 11, wherein the operations further comprise generate an image of intermediate dimensions prior to up-sampling or down-sampling the image, wherein the image of intermediate dimensions preserves an aspect ratio of the object.

17. The computer-readable medium of claim 11, wherein obtaining the first dimensional measurement of the object includes scanning the object to determine the first dimensional measurement.

18. A system comprising:
one or more processors; and
one or more non-transitory computer-readable media containing instructions that, when executed by the one or more processors, cause a machine to perform or control performance of operations, the operations comprising:

obtain a photographic representation of an object and a first dimensional measurement of the object;

determine a bounding box for the object, the bounding box having dimensions along length X, height Y, and depth Z axes, at least one of the dimensions corresponding to the first dimensional measurement, the bounding box based on pixels in the photographic representation that belong to the object in the photographic representation;

obtain a size of a display, the size represented by pixels per inch of the display;

calculate a scaling factor, wherein the scaling factor is calculated based on a size of a second object positioned relative to the object in the photographic representation, the first dimensional measurement, and the size of the display;

calculate a second dimensional measurement of the object based on the height Y of the bounding box and the scaling factor;

calculate a third dimensional measurement of the object based on the height Y of the bounding box and the scaling factor;

up-sample or down-sample the photographic representation to a projected size based on the second and third dimensional measurements; and present at least a portion of the up-sampled or down-sampled photographic representation.

19. The system of claim 18, further comprising a scanner, wherein obtaining the first dimensional measurement of the object includes causing the scanner to scan the object to determine the first dimensional measurement.

* * * * *

UNITED STATES PATENT AND TRADEMARK OFFICE
CERTIFICATE OF CORRECTION

PATENT NO. : 10,445,856 B2
APPLICATION NO. : 15/673262
DATED : October 15, 2019
INVENTOR(S) : Mihir Naware et al.

Page 1 of 1

It is certified that error appears in the above-identified patent and that said Letters Patent is hereby corrected as shown below:

In Column 12, Line 2, in Claim 1, before "based" delete "as".

In Column 13, Line 5, in Claim 11, before "based" delete "as".

Signed and Sealed this
Twenty-eighth Day of July, 2020

Andrei Iancu
*Director of the United States Patent and Trademark Office*